United States Patent [19]

Hasebe et al.

[11] Patent Number: 4,747,925

[45] Date of Patent: May 31, 1988

[54] APPARATUS FOR SIMULTANEOUS GENERATION OF OXYGEN AND HYDROGEN GASES

[75] Inventors: Shigeta Hasebe, Tokyo; Takeo Miyazawa, Yamato; Susumu Daidoji, Tokyo, all of Japan

[73] Assignee: Kabushiki Kaisha Miyazawa Seisakusho, Yamato, Japan

[21] Appl. No.: 878,062

[22] Filed: Jun. 24, 1986

[51] Int. Cl.⁴ .......................... C25B 1/06; C25B 9/00
[52] U.S. Cl. .................................. 204/270; 204/278; 204/129; 204/DIG. 5
[58] Field of Search ......... 204/129, 266, 278, DIG. 5, 204/269, 270

[56] References Cited

U.S. PATENT DOCUMENTS

| | | | |
|---|---|---|---|
| 3,969,214 | 7/1976 | Harris | 204/DIG. 5 |
| 4,105,528 | 8/1978 | Hasebe | 204/DIG. 5 |
| 4,107,008 | 8/1978 | Horuath | 204/129 |
| 4,469,759 | 9/1984 | Newill | 204/DIG. 5 X |
| 4,599,158 | 7/1986 | Ofenloch | 204/278 |

Primary Examiner—Donald R. Valentine
Attorney, Agent, or Firm—Trexler, Bushnell, Giangiorgi & Blackstone, Ltd.

[57] ABSTRACT

While a large number of positive and negative electrodes are alternately arranged in an alignment on a same level in an electrolytic tank, a pair of magnets having the polarities thereof fixed in the same direction and which are disposed along the direction horizontally orthogonal to the arrangement of the electrodes of the same level, so that an electric field and a magnetic field will be generated on the horizontal directions orthogonal to each other and a force according to the Fleming's left-hand rule will be directed to the upward direction perpendicular to both the electric field and the magnetic field. The small bubbles adherent to the surface of the electrodes are enabled to be separated therefrom and allowed to float up owing to the addition of the upward force to their insufficient buoyancy.

2 Claims, 3 Drawing Sheets

APPARATUS FOR SIMULTANEOUS GENERATION OF OXYGEN AND HYDROGEN GASES

BACKGROUND OF THE INVENTION

1. Field of the Invention

This invention relates to an apparatus for simultaneous and continuous generation of oxygen gas and hydrogen gas either in an intermixed state or in separate states from a unitary mechanism.

It is universally known that there have existed numerous devices for separate generation of oxygen or hydrogen. This invention easily permits the aforementioned separate generation. The primary object of this invention resides rather in deriving many benefits from simultaneously generating a mixed oxygen-hydrogen gas from a unitary mechanism.

The reason for this primary object is as follows. Hydrogen and oxygen react with each other to form water at room temperature. When this reaction is promoted with electric spark or with a platinum catalyst, it proceeds exothermally with explosive vigor. The reaction evolves a heat of 68.313 kcal/mol at 25° C. under 1 atmosphere, for example. In this case, the temperature can reach 2,800° C. Thus, it is useful as an oxyhydrogen torch in thermal treatments such as welding and cutting steel plates and deforming glass articles. It can also be utilized easily as a direct heat source or light source.

The welding by the use of a mixed oxygen-hydrogen gas (hereinafter referred to as "oxyhydrogen welding") is held to excel the other methods of welding such as, for example, oxyacetylene gas welding, arc welding, and electric resistance welding in the following points, i.e. the point that since the phenomena of oxidation and nitration possibly induced during the welding operation are suppressed, alterations of mechanical properties causable in such readily oxidizable metals, light alloys, and nichrome steels in consequence of padding, cutting, and other works during the welding operation are small and the point that the original strength and hardness can be retained intact.

2. Description of the Prior Art

In the conventional oxyhydrogen welding, however, high-pressure oxygen gas and hydrogen gas separately contained as compressed in a seamless cylindrical container of steel of a large wall thickness generally passing as a "bomb" are used as mixed in a prescribed ratio such as, for example, 1:4. It is universally known that the bomb is so heavy as to render the mobility or portability of the welding operation inferior and further that rigid control regulations are imposed on the welding operation to preclude various dangers arising from the handling of high-pressure gases.

If a device is developed which permits continuous supply of a mixed oxygen-hydrogen gas conveniently under atmospheric pressure, the aforementioned hazards to the oxyhydrogen welding operation will be completely eliminated.

Among the well-known conventional means of generating a mixed oxygen-hydrogen gas is counted a device which relies on the electrolysis of water. To describe the fundamental construction and operation of this device, a pair of electrodes are parallelly set up in an electrolyte of the smallest possible electric resistance such as, for example, an aqueous 20% sodium hydroxide (NaOH) or 30% potassium hydroxide (KOH) solution and a direct electric current is passed between the electrodes. In the aqueous solution which now constitutes an ion conductor, the cations migrate toward the cathode and the anions toward the anode and, as the result, chemical reactions occur in the boundaries between the electrodes and the ion conductor to generate oxygen ($O_2$) from the anode and hydrogen ($H_2$) from the cathode in the ratio of 1:2 in the form of bubbles. The Faraday's law is established between the amount of bubbles and the amount of electricity generated. The two amounts are directly proportional to each other. Where the bubbles are expected to be generated in a large amount, the electric field energy is required to be proportionately large.

The bubbles which are generated on the surface of the electrodes are invariably small globules. The buoyancy possessed by the bubbles themselves is not sufficient for the bubbles to separate themselves from the plate surfaces and float to the top of the aqueous solution. When the group of small globules have grown to the extent of acquiring a total buoyancy past a certain level, the globules set themselves free from the surface of the electrodes and float up. Especially when a multiplicity of electrodes are densely installed side by side, the uniformity of float of such bubbles is liable to be impaired. The phenomenon of such interrupted float of gas as described above is greatly inconvenient where the gas is required to be continuously supplied in a fixed flow volume. In the meantime, the group of bubbles adhering to the surface of electrodes function as an insulating layer and possibly degrade the ability of electric conduction and decelerate the occurrence of electrolysis.

As one means of solving the aforementioned inconvenience, it may be conceived to fix the electric field energy constantly at a large excess and heighten the ability itself to generate the group of bubbles. This method, however, has the possibility of entailing continuous consumption of a large volume of electric power for a long time.

SUMMARY OF THE IVNENTION

The first object of this invention is to eliminate the disadvantage completely and create and provide an apparatus for simultaneous generation of oxygen and hdyrogen gases, which enables even small bubbles of insufficient buoyancy to be quickly separated from the surface of electrodes and allowed to float up, permits continuous supply of oxygen and hydrogen gases in a fixed volume, retains the ability of electric conduction satisfactorily and enables the electric field energy to be effectively utilized constantly.

The second object of this invention is to create and provide an inexpensive apparatus for simultaneous generation of oxygen and hydrogen gases, which permits minimization of the electric power to be supplied and consumed as the electric field energy and decrease of the amount of water consumed to only 1/1800 of the amount of gases to be generated.

The third object of this invention is to create and provide a small apparatus for simultaneous generation of oxygen and hydrogen gases, which for the formation of a mixed oxygen-hydrogen gas, has no use for the conventional high-pressure bomb adapted to contain the two gases therein and can be handled and moved easily and safely.

The fourth object of this invention is to create and provide an apparatus for simultaneous generation of oxygen and hydrogen gases, which permits oxygen gas and hydrogen gas to be easily taken out in an intermixed state or in mutually separated states.

The fifth object of this invention is to obtain an apparatus which is capable of generating meagerly flammable, safe, and stable para-hydrogen as compared with the highly flammable and dangerous ortho-hydrogen generated by the conventional apparatus.

The sixth object of this invention is to obtain an apparatus for simultaneous generation of oxygen and hydrogen gases, of which the produced gases are reverted to water on combustion and have no possibility of causing any environmental pollution.

The seventh object of this invention is to obtain an apparatus for simultaneous generation of oxygen and hydrogen gases, of which the produced mixed gas can be used for welding works performed under atmospheric pressure, negative pressure, or water, can be used as fuels for general purposes and for operation of vehicles, can be utilized for production of glass articles, fabrication of optical fibers, and fabrication of semiconductors, and can serve for purification of air.

The other objects and characteristics of the present invention will become more apparent to those skilled in the art as the disclosure is made in the following description of preferred embodiments of the invention, as illsutrated in the accompanying drawings.

DETAILED DESCRIPTION OF THE INVENTION

This invention, to accomplish the objects described above, effects simultaneous generation of a mixed oxygen-hydrogen gas by disposing at least one pair of positive and negative electrodes as opposed to each other inside a water tank provided on the upper side thereof with a gas outlet hole and disposing at least one pair of magnetic members with the polarities thereof fixed in one and the same direction so that the forces thereby will be directed upwardly in accordance with the Fleming's left-hand rule in connection with the direction of the potential difference generated between the pair of electrodes.

Separate issue of oxygen and hydrogen is attained by interposing a diaphragm between the pair of electrodes and, at the same time, forming separate outlet holes for the two gases.

Figure 1:
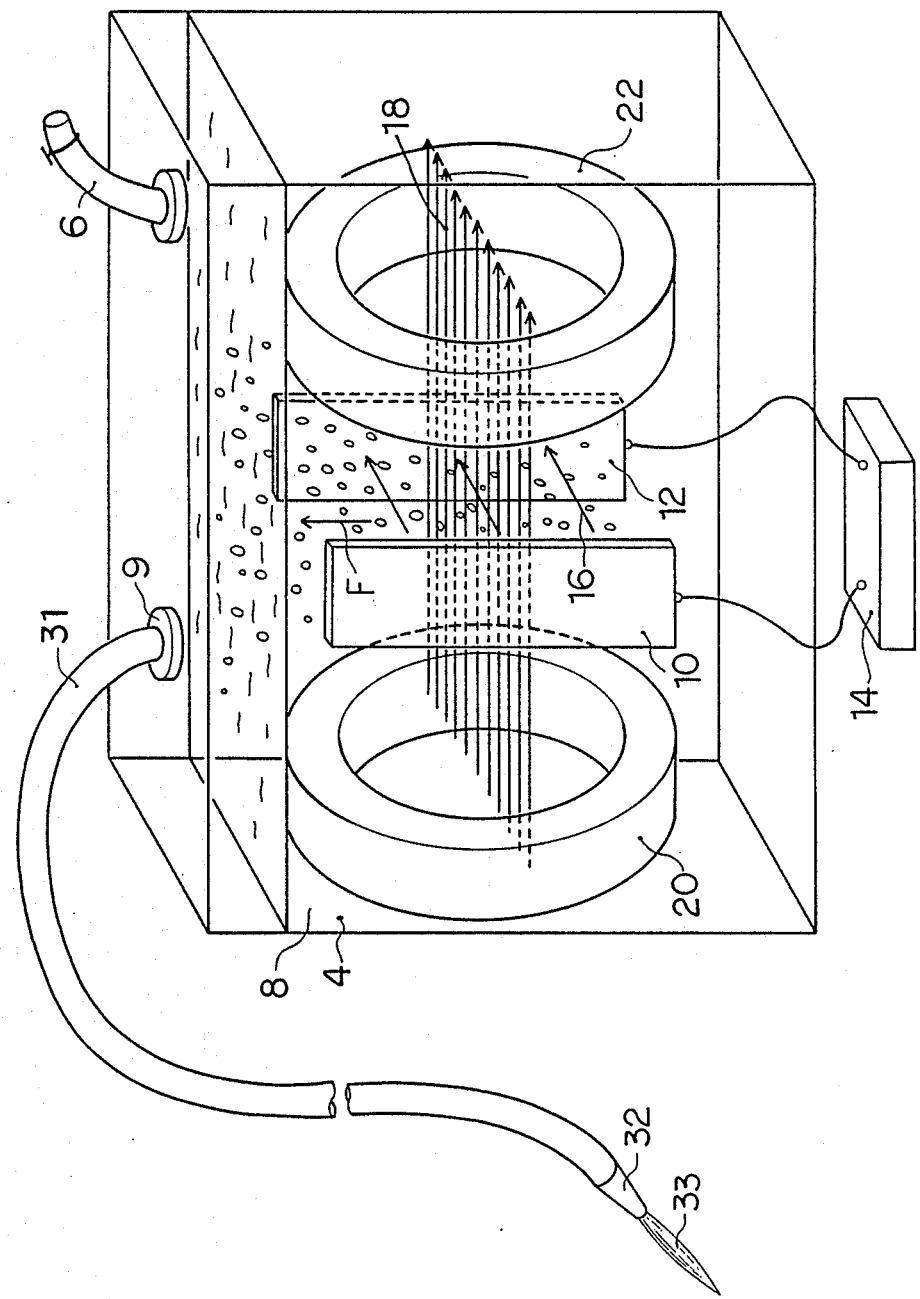
FIG. 1 is an explanatory diagram illustrating the principle of the present invention.

First with reference to FIG. 1, a tank 4 is filled with an aqueous electrolyte solution 8 of a small magnitude of electric resistance introduced through a water inlet 6. In the aqueous solution, a pair of electrodes, i.e. an anode 10 and a cathode 12, are disposed as opposed to each other.

When a direct electric current from a DC power source 14 installed outside the tank is passed between the two electrodes, a potential difference is produced between the two electrodes and an electric field is formed in the direction, of the arrow 16. Consequently, the aqueous solution 8 constitutes itself an ion conductor and the cations in the solution migrate toward the cathode 12 and the anions toward the anode 10 and bubbles of oxygen issue from the boundary of the anode 10 and bubbles of hydrogen from the boundary of the cathode 12 in a ratio of 1:2.

The construction and operation described above are nothing but those of the conventionally well-known means of generation of oxygen and hydrogen gases by the electrolysis of water. The present invention has mended the defects inherent in the conventional means described above.

The group of bubbles of oxygen and hydrogen formed on the boundaries between the two electrodes and the ion conductor at first are only a group of minute bubbles whose individual buoyancy is too weak for the bubbles to liberate themselves from the surface of electrodes. Thus, the group of these minute bubbles adhere densely to the surface. The group of minute bubbles so adhering function as an insulating layer for intercepting the electric field 16 and the ability of the boundaries to generate bubbles is degraded. Under these conditions, continuous supply of oxygen and hydrogen gases in a fixed volume cannot be guaranteed.

In the present invention, therefore, a pair of powerful magnetic members 20 and 22 are parallelly disposed so as to establish a magnetic field 18 in the direction conforming to the Fleming's left-hand rule with respect to the electric field 16, i.e. in the direction from left to right perpendicularly to the electric field 16 directed from the nearer side to the farther side in the diagram of FIG. 1. Consequently, there is generated a force F directed upwardly in accordance with the Fleming's left-hand rule.

When the group of minute bubbles so far adhering inevitably to the surface of the electrodes owing to the deficiency of buoyancy are exposed to the aforementioned force F, they are observed to drift quickly upwardly, namely, in the direction perpendicular to both the electric field 16 and the magnetic field 18.

In other words, the individual bubbles are enabled to set themselves free from the adhesive force of the surface of the electrodes owing to the addition of the aforementioned force of drifting to their individual buoyancy. As the result, the bubbles are enabled to float up toward the free surface of the aqueous solution.

The floating movement due to the drift seems to occur commonly on both the oxygen gas and the hydrogen gas. Particularly to the hydrogen gas, the following inference appears to apply.

It is widely known that hydrogen has two atomic nuclei spinning in each of the molecules thereof. The hydrogen of the kind having both the atomic nuclei spinning in one direction is called ortho-hydrogen and that of the kind having the atomic nuclei spinning in opposite directions is called para-hydrogen. Under the condition of at least normal room temperature, the two kinds of hydrogen occur in the proportions of one para-hydrogen molecule per three ortho-hydrogen molecules. It is held that the hydrogen molecules in the ortho state are instable because repulsive force is exerted between the atomic nuclei, whereas the hydrogen molecules in the para state are stable and are activated because attractive force is exerted between the atomic nuclei. It is held that the instable ortho-hydrogen can be converted into the stable para-hydrogen by using magnetic members as a catalyst.

In the present invention in which hydrogen molecules are placed where the electric field 16 and the magnetic field 18 perpendicularly intersect each other, therefore, if the direction of the force F is assumed to be opposite the direction of spin of orthohydrogens, the ortho-hydrogens will be converted into para-hydrogens and, if the direction of the aforementioned force F is assumed to be in agreement with the direction of spin of para-hydrogens, the para-hydrogens will be further accelerated and enabled to float up.

When the quick incessant floating movement of bubbles is realized as described above, the group of bubbles otherwise suffered to adhere fast to the surface of electrodes are always kept cleared of the surface of electrodes. Thus, the surface of each of the electrodes enables the aqueous solution as the ion conductor to promote the electrode reaction again. As the result, the effect of electrolysis is notably promoted and the formation of bubbles is attained efficiently even when the electric field energy is small.

Figure 2:
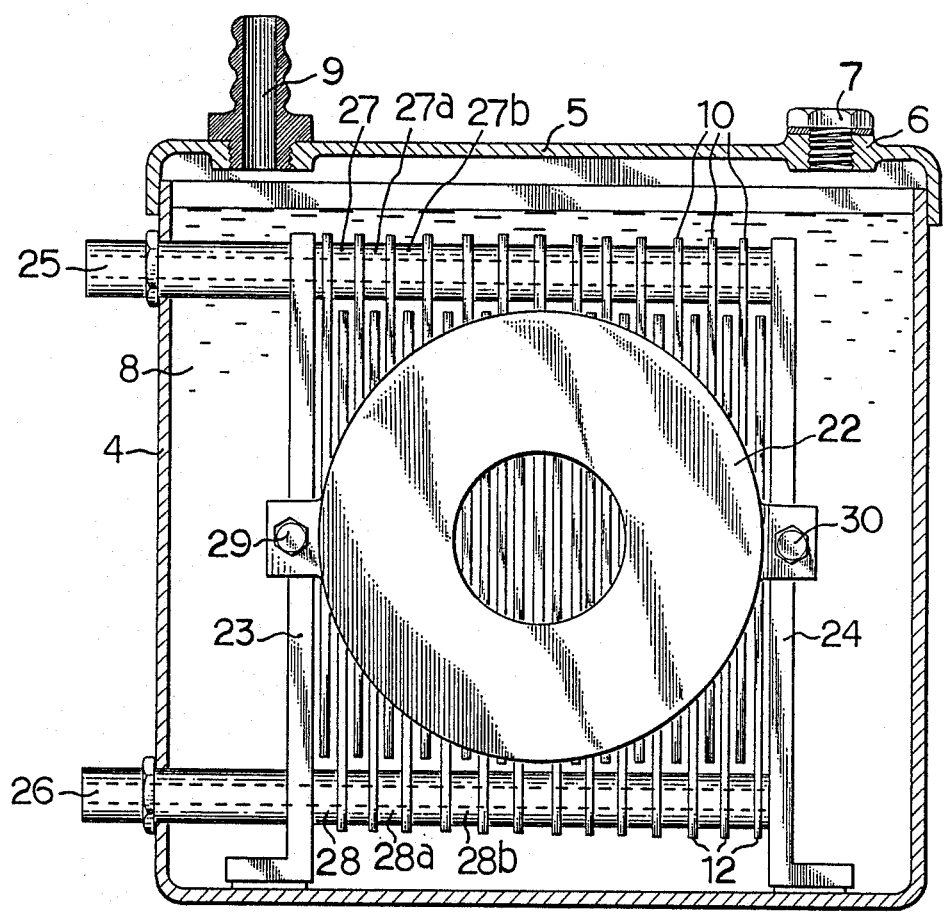
FIG. 2 is a longitudinally sectioned front view illustrating a concrete embodiment of the present invention.
Figure 3:
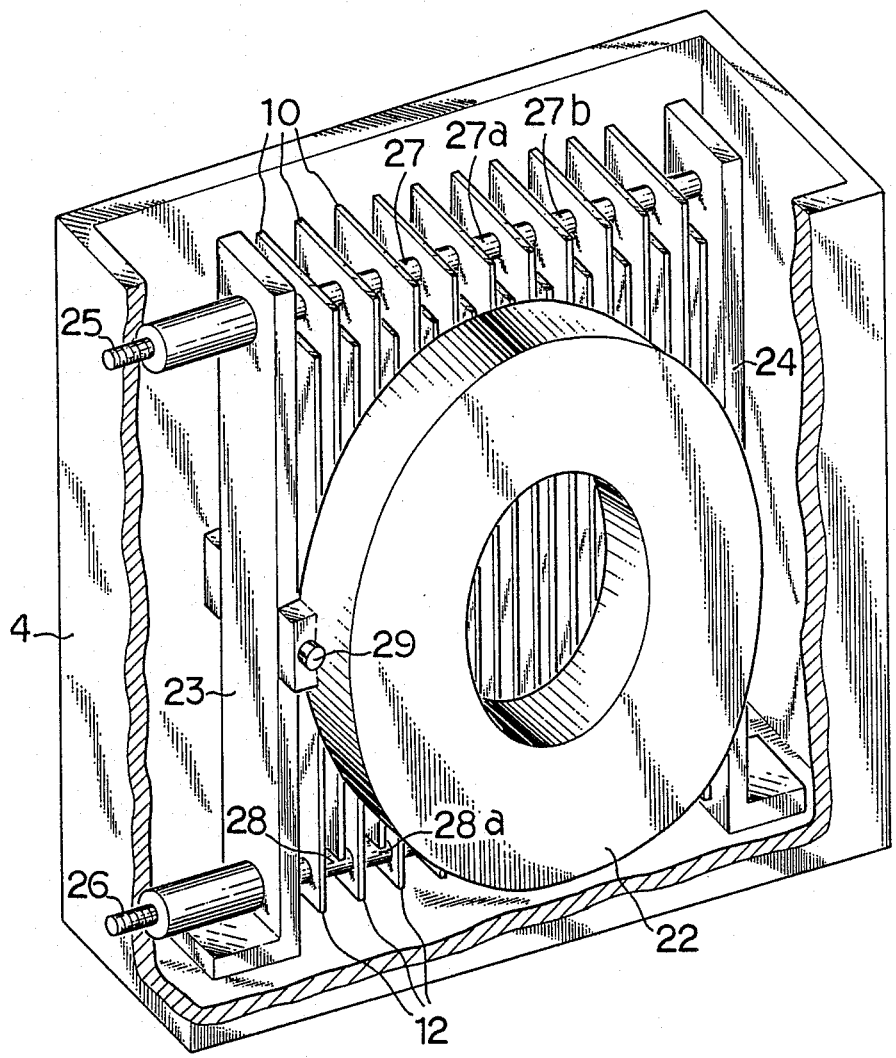
FIG. 3 is a perspective view of a tank, with the front side cut away.

Now, a concrete working example of this invention will be described in detail below with reference to FIG. 2 and FIG. 3.

A rectangular tank 4 has a lid 5. This lid is provided with a water inlet hole 6 fitted with a plug 7 and a gas outlet hole 9. The tank 4 is filled with an aqueous electrolyte solution 8.

Side frames 23 and 24 are parallelly disposed at the left and right ends of the inner bottom of the tank. Terminal bars 25 and 26 are supported between the upper parts and between the lower parts respectively of the frames. On the upper terminal bar 25, upper electrodes (such as anodes 10) of a non-magnetic material are arrayed through the medium of spacers 27, 27a, 27b, ... of an equal length. On the lower terminal bar 26, lower electrodes (such as cathodes 12) of a non-magnetic material are arrayed through the medium of spacers 28, 28a, 28b, ... of an equal length. When the two sets of electrodes are inserted into each other so that the electrodes will fall equidistantly and will not come into mutual contact, there are formed electric fields (denoted by 16 in FIG. 1) common to all the electrodes because all the pairs of positive and negative electrodes are arranged so as to produce potential differences in one and the same direction.

Annular permanent magnets 22 and 20 having polarities thereof fixed in one and the same direction are parallelly disposed respectively on the nearer side and the farther side of the laminated electrodes. Consequently, a magnetic field (denoted by 18 in FIG. 1) is formed in a state perpendicularly intersecting the aforementioned electric fields. The numerical symbols 29 and 30 stand for fixing bolts used for fixing the magnets to the side frames.

Use of the apparatus of the present invention for oxyhydrogen welding or cutting is accomplished, for example, by fitting a flexible gas pipe 31 to the gas outlet hole 9, attaching a burner nozzle 32 to the leading end of the gas pipe, and igniting the gas issuing from the nozzle 32 as illustrated in FIG. 1. Consequently, the mixed oxygen-hydrogen gas spouting through the nozzle turns into a flame 33, which can be immediately used for the welding.

Separate discharge of the oxygen gas and the hydrogen gas which are simultaneously formed can be easily attained, as widely known, by interposing diaphragms (not shown) one each between the cathodes and the anodes and forming in the lid separate outlet holes (not shown) for oxygen and hydrogen.

The two gases thus taken out separately of each other are suitable for independent use. Otherwise, they may be used as mixed with each other again.

It is easy to furnish the apparatus with means of switching between the two modes, mixed discharge and separate discharge of the gases, so that the gases will be used in whichever of the modes to be selected to suit the occasion.

To ensure perfect safety of the operation of the apparatus, the apparatus may be provided at various positions thereof with flow meters, safety valves, means of preventing backfire, and means of actuating an automatic discharge device and discharging the produced mixed gas outdoors in case of power failure.

The first effect of the present invention resides in the fact that since the magnetic field 18 is established perpendicularly to the electric field 16 and, consequently, the force F directed upwardly is exerted upon the group of minute bubbles adhering to the surface of electrodes, this force F serves the purpose of enabling the group of bubbles to separate from the surface of the electrodes 10 and 12 and float up, warrants continuous stable supply of oxygen and hydrogen gases in a fixed amount, eliminates completely the disadvantage that the fast adhesion of the group of minute bubbles to the surface of electrodes has produced an insulating activity and lowered the property of electric conduction, enables the ability of the surface of electrodes in the conduction of electricity to remain in the most desirable state at all times, and permits the electric field energy to be effectively utilized.

The second effect of this invention resides in the fact that in connection with the first effect described above, the running cost incurred in the operation of the apparatus of this invention is small because the conventionally inevitable constant supply of the electric field energy in a large excess is no longer required and the supply of electric power necessary at all for the formation of an electric field is sufficient.

The third effect of this invention resides in the fact that in the formation of a mixed oxygen-hydrogen gas, since this invention enables the two gases to be generated simultaneously under atmospheric pressure, the apparatus of this invention is notably easy and safe in its handling and operation, especially in transportation and movement, as compared with the conventional apparatus resorting to a high-pressure bomb.

The fourth effect of the present invention resides in the fact that the oxygen gas and the hydrogen gas can be very easily delivered either in a mixed state or in mutually separated states to suit the occasion.

The fifth effect of this invention resides in the fact that the apparatus, in spite of the incorporation of one generating tank having an inner volume of 10 liters, is extremely compact (measuring 34 cm in width, 73.5 cm in height, and 40 cm in length, for example) and capable of generating 1,200 to 1,300 cc of hydrogen of purity of 99.9999% at the expense of an electric power of 300 to 400 W from a power source of a single phase, AC 100 V 5 A, for example, and the produced gas has a pressure of 0.5 to 3.0 kg per cm$^2$ and a calorific level of 53.8 Kcal at 25° C. under 1 atmosphere for the consumption rate of 1 liter per minute.

The sixth effect resides in the fact that the apparatus of this invention enjoys high safety because it is capable of converting the highly flammable dangerous ortho-hydrogen into the sparingly flammable, safe and stable para-hydrogen.

The seventh effect of this invention resides in the fact that the apparatus of this invention has no possibility of causing any environmental pollution because the produced gas is reverted to water on combustion.

The eighth effect of this invention resides in the fact that the produced gas can be used for welding works performed under atmospheric pressure, negative pressure or water, for fabrication of glass articles, optical fibers, and semiconductors, as fuels for general purposes and for operation of vehicles, and for the purification of air.

While the present invention has been described by means of specific embodiments, it is to be understood that numerous changes and modifications may be made therein without departing from the spirit and scope of the invention as defined in the appended claims.

What is claimed is:

1. Apparatus for simultaneous generation of oxygen and hydrogen gases, which comprises
   a tank for containing an aqueous electrolyte solution;
   a plurality of positive and negative electrodes alternately arranged in an opposing alignment on a same vertical level in the tank; and
   a pair of magnets having the polarities thereof fixed in the same direction and which are disposed along the direction horizontally orthogonal to the arrangement of the electrodes on said vertical level, so that the magnetic field generated by said magnets is orthogonally superimposed upon the electric field generated by said plurality of electrodes, in order to impose upwardly directed force perpendicular to both the electric field and the magnetic field generated by the electrodes and the magnets, in accordance with Fleming's left-hand rule.

2. Apparatus for simultaneous generation of oxygen and hydrogen gases, which comprises
   a tank for containing an aqueous electrolyte solution;
   a pair of side frames disposed in the tank;
   an upper terminal bar and a lower terminal bar supported between upper pair and between lower parts of said frames respectively;
   a plurality of upper electrodes each of which comprise a rectangular plate of non-magnetic material and which are disposed in parallel arrangement on the upper terminal bar and separated by spacers of an equal length;
   a plurality of lower electrodes each of which comprise a rectangular plate of non-magnetic material and which are disposed in parallel arrangement on the lower terminal bar and separated by spacers of an equal length;
   the said upper and lower electrodes arranged in alternate opposition for interleaved alignment; and
   a pair of magnets having the polarities thereof fixed in the same direction and which are disposed along the direction horizontally orthogonal to the arrangement of the electrodes in relation to said upper and lower frames in order to impose upwardly directed force perpendicular to both the electric field and the magnetic field generated by the electrodes and the magnets, in accordance with Fleming's left-hand rule.

* * * * *